United States Patent [19]

Bruce et al.

[11] Patent Number: 4,538,033
[45] Date of Patent: Aug. 27, 1985

[54] DATA BRIDGE WITH GATING AND/OR TESTING

[75] Inventors: Duncan Bruce, Staatsburg; Charles E. Conklin, Pleasant Valley, both of N.Y.

[73] Assignee: Conklin Instrument Corporation, Pleasant Valley, N.Y.

[21] Appl. No.: 566,705

[22] Filed: Dec. 29, 1983

[51] Int. Cl.$^3$ ............................................. H04M 1/24
[52] U.S. Cl. .............................. 179/175; 179/175.3 R
[58] Field of Search ........ 179/175.3 R, 18 A, 18 AA, 179/18 C, 175.1 R, 175, 175.11, 2 A, 75.2 R; 324/58 R; 178/2 C, 2 D, 2 E, 4.1 B, 69 R, 69 G; 370/14, 15

[56] References Cited

U.S. PATENT DOCUMENTS

| | | | |
|---|---|---|---|
| 3,371,165 | 2/1968 | Earle et al. | 179/175.3 |
| 3,814,840 | 6/1974 | Lubarsky, Jr. et al. | 178/2 C |
| 4,055,808 | 10/1977 | Holsinger et al. | 178/69 G |
| 4,258,236 | 3/1981 | Conklin et al. | 179/175.3 R |
| 4,403,119 | 9/1983 | Conklin et al. | 179/175.3 R |

Primary Examiner—Stafford D. Schreyer
Attorney, Agent, or Firm—Bernard, Rothwell & Brown

[57] ABSTRACT

A communication bridge joining a primary communication channel to a plurality of secondary communication channels has electrically operated switches in series with the respective ports to the secondary communication channels. Control signals applied to the primary channel are utilized to address the bridge and to selectively drop or add secondary ports. Additionally a loopback circuit can be connected and disconnected in the primary port.

20 Claims, 8 Drawing Figures

DATA BRIDGE WITH GATING AND/OR TESTING

BACKGROUND OF THE INVENTION

1. Field of the Invention

The present invention relates to telephone or data communication systems for connecting a plurality of remote user stations to a computer, and particularly to such systems including facilities for locating and isolating malfunctions which may occur in the systems.

2. Description of the Prior Art

Computers are often connected through telephone or data communication systems to a plurality of remote user stations by use of data bridging circuits. One such prior art system or network employs a four-wire trunk network including parallel transmitting and receiving lines to which the computer is connected at one end, and at the remote end, a data bridging circuit is utilized to join the four-wire trunk from the computer to a plurality of four-wire branch or drop channels to user stations and/or to other bridges which may in turn branch to additional user stations and/or additional bridges. The process of connecting a plurality of bridges in series is referred to as "cascading." The bridges so employed incorporate adjustable amplifiers, resistance pads, and isolation transformers to join the primary collection and distribution ports to the pluralities of secondary collection and distribution ports serving the user stations. These incorporated features are necessary to provide appropriate signal levels and signal conditioning on the primary and secondary four-wire service lines. The bridges may be located in widely separated telephone substations, switching offices, or user premises. User terminals will seize the communication system in order to communicate with the computer. The system is automatically released from seizure when individual communications are finished.

Malfunctions can occur in any of the lines. These can include malfunctions such as short circuits, open circuits, excessive noise generation; or user station equipment, such as terminals, modems, or other data transmission devices may malfunction and continously seize the network lines. This type of seizure is referred to as data streaming. When this occurs, coherent data cannot be transmitted. Further, such seizure cannot recognize an unseized condition. Such data streaming can be said to take down the entire network under those conditions. Complex efforts are required in order to correct data streaming conditions. Those efforts may extend for considerable distances through various telephone facilities. They are time-consuming efforts and may involve considerable manpower and office coordination in order to permit isolation of all user station facilities. Eventually manual testing of the individual lines is necessary to determine the source of malfunction and to take corrective action in isolating the malfunction in order to permit the restoration of network services.

The prior art utilizes remote switching and testing units which are installed at various points in the system, principally the end-user locations. These units can be signaled by an operator from respective bridge locations in order to provide isolation of the user station facilities. More sophisticated trunking capability from time to time will permit automated isolation of trunk locations but does not normally provide the ability to isolate user station facilities. One prior art user station testing capability generally consists of a loopback test circuit which is connected and disconnected from the network by a specific frequency of 2713 Hertz. This signal must be individually transmitted to each location. Since all user station terminating units respond to 2713 Hertz, it is obvious that a 2713 Hertz signal which would appear at a four-wire network would also appear at all user stations by virtue of passing through the bridge to those stations. This condition would create widespread unwanted loopback and, in fact, deter any testing capability.

Prior art examples of channel terminating units which address the difficulty of unwanted loopback are described in U.S. Pat. Nos. 3,814,840, 4,258,236, and 4,403,119. These remote testing units may each include facilities which interpret a pulse code, a single frequency code or a dual tone multi-frequency (DTMF) address code, so that an operator can establish a discrete address code for each remote unit and by applying conventional pulse, single frequency or DTMF signaling capability, address the discrete unit through a plurality of bridging circuits and network circuitry common to all units. The prior art terminating units also may include the ability to remotely control the command ability of various testing functions, such as conventional four-wire loopback, transmission of a milliwatt signal, and the creation of a quiet termination mode in the transmit path by opening the transmit line through a command switching address function.

SUMMARY OF THE INVENTION

The invention addressed in this application consists primarily of a data communication bridge, which includes trunk address facilities connected to the primary port of the bridge, which enable address facilities selectively to call individual bridges into loopback or to drop or add individual or groups of secondary ports on the customer or drop side of each bridge by discrete address and command codes. The discrete loopback ability enables cascaded bridges to be addressed in specific sequence. Typically, a bridge at the far end of a cascaded network would be the first bridge to be addressed in an effort to determine if the circuit difficulty existed within that bridge. Succeeding bridge addresses would be directed to each nearer bridge through the four-wire trunk network. Eventually, the bridge which contained the circuit fault or faulty equipment would be isolated. When the discrete loopback addressability has isolated a bridge containing the faulty circuit or faulty equipment, the testing operator from a remote location can summarily and sequentially address the individual ports until such time as the faulty equipment contained on the drop side of the bridge, or the circuit fault which exists on the drop side of the bridge, could be identified as to the affected port. When that port has been located, the receive transmission pair at the bridge is opened via an addressable command isolating any transmission ability of that port and preventing the troubles within the user station or circuit from having influence on the entire network.

The invention is summarized in a communication bridge which includes bridge address facilities connected to a primary port of the bridge for enabling port address facilities which selectively operate switches in series with secondary ports coupled to the primary port of the bridge. The bridge address facilities respond to one portion of a series of control signals enabling the bridge. The port address facilities, when enabled, respond to a second portion of the series of control signals selecting the switch or switches in the secondary port circuits to be operated.

In another aspect of the invention, a communication bridge includes loopback switching facilities in the primary port circuit for being selected by a bridge address signal portion and a port address signal portion.

In still another aspect of the invention, a communication bridge employs facilities responsive to a mode series of control signals for controlling connection or disconnection of a switch or switches in series with bridge ports.

In a further aspect of the invention, a telephone system with testing facilities includes one or more bridges with bridge address facilities and port address facilities for selectively connecting or disconnecting ports, and testing units connected in individual lines with test unit address facilities for connecting or disconnecting the individual lines, said bridge address facilities being responsive to a first series of control signals containing N DTMF address digits and said testing module address facilities being responsive to a second series of control signals containing M DTMF address digits wherein M is not equal to N so that address codes for the bridges do not correspond to address codes for the testing units.

An object of the invention is to construct an addressable bridge having addressable port facilities for connecting and disconnecting selected ports.

Another object of the invention is to eliminate the necessity to connect individual testing module units to lines at points adjacent to bridges.

One advantage of the invention is that installation costs for installing data communication systems with telephone line testing facilities is substantially reduced due to the elimination of the need to install separate testing units in individual communicating circuits.

Other objects, advantages and features of the invention will be apparent from the following Description of the Preferred Embodiment taken in conjunction with the accompanying drawings.

DESCRIPTION OF THE PREFERRED EMBODIMENT

Figure 1:
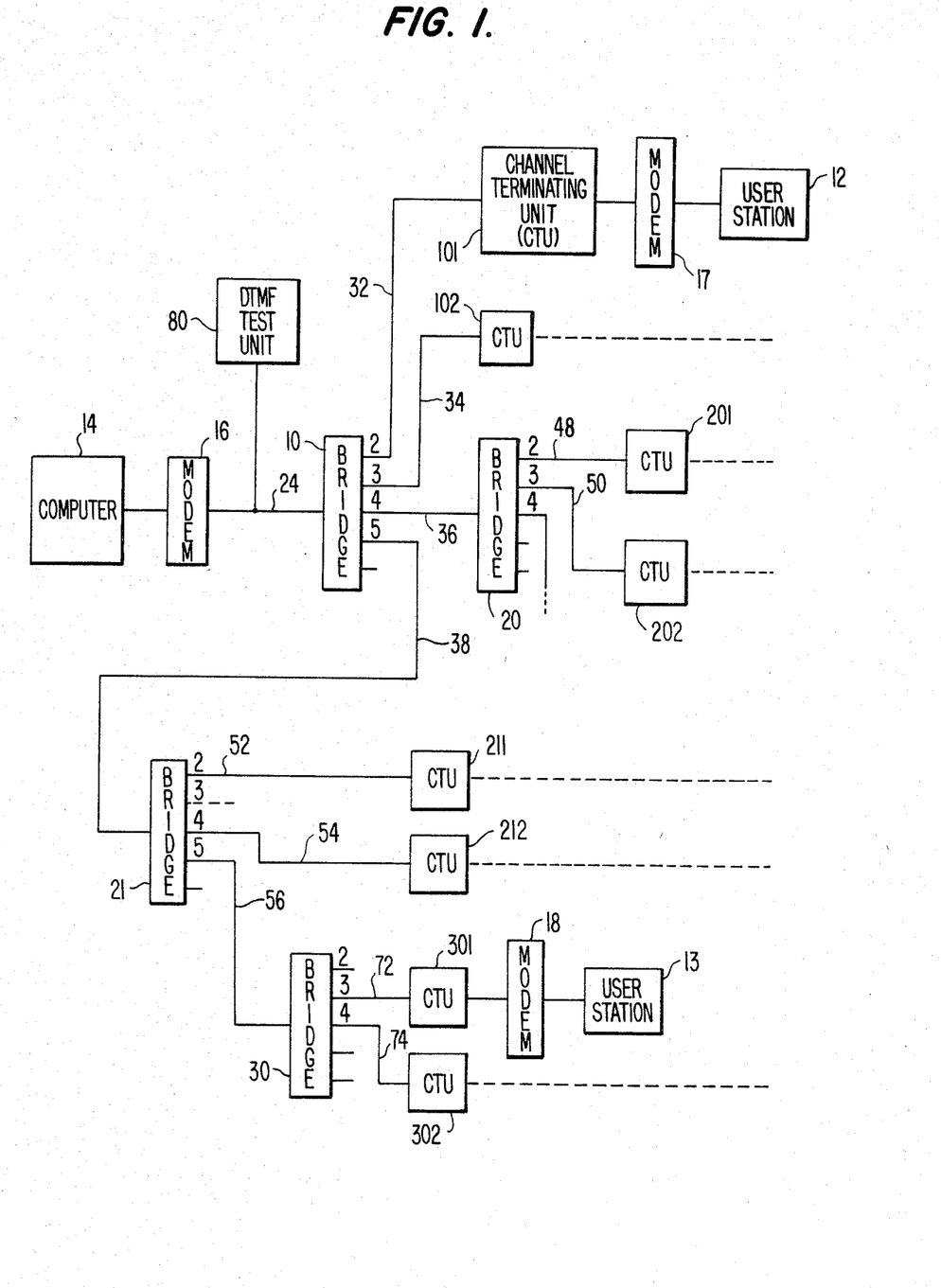
FIG. 1 is a block diagram of a data communication system in accordance with the invention.
Figure 2:
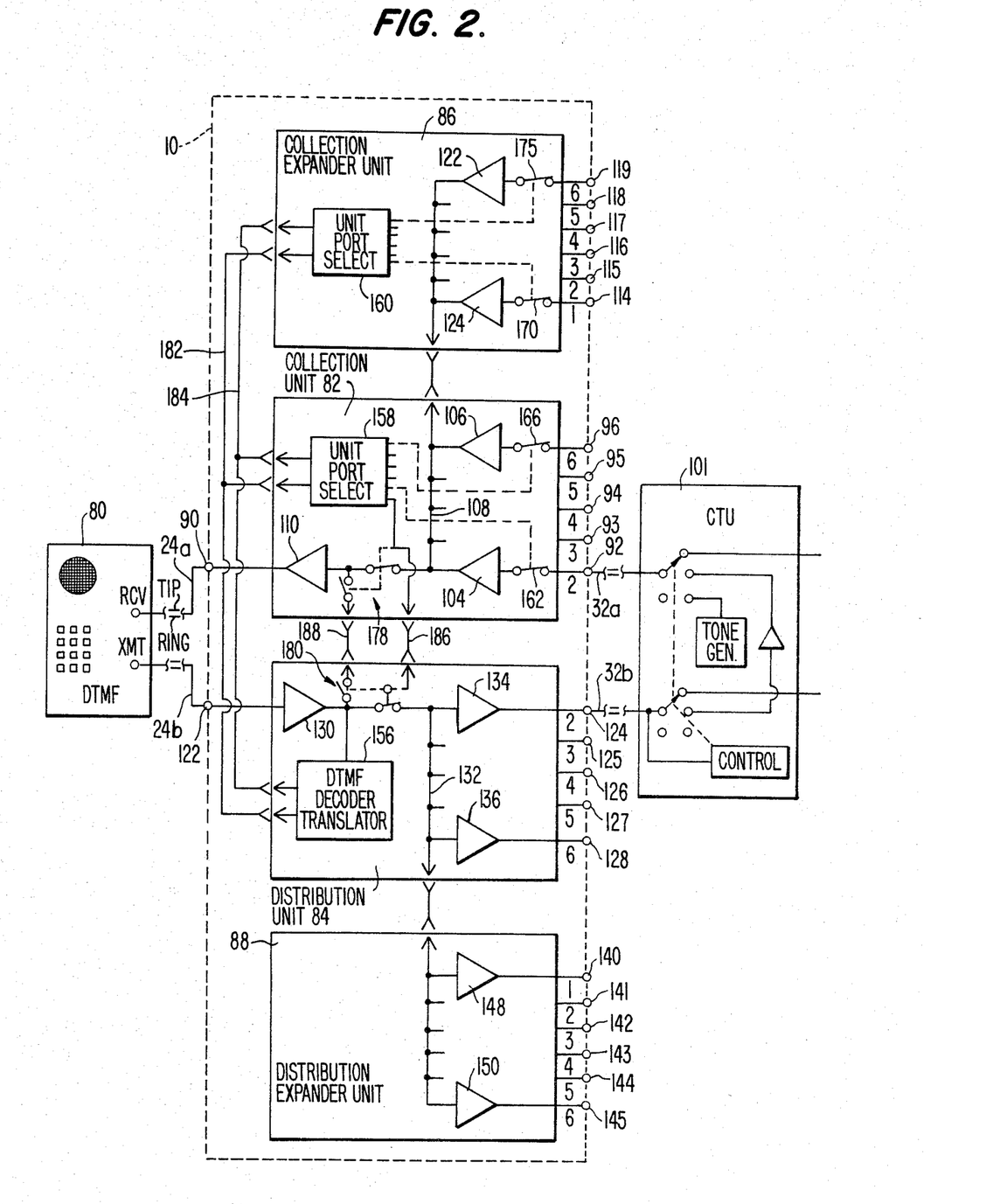
FIG. 2 is a block diagram of a bridge portion of the communication system of FIG. 1.

As illustrated in FIG. 1, the invention is embodied in a data communication system or network for connecting a plurality of remote user stations, only two user stations 12 and 13 shown in FIG. 1, to a central computer 14. The user stations 12 and 13 may comprise terminals or computers which receive and/or transmit information from or to the computer 14. Modems 16, 17 and 18 may be utilized to couple the computer 14 and user stations to the communication system or network which may be formed by data grade telephone lines 24, microwave channels, or other means for providing transfer of information over distances. The telephone lines 24 particularly may be a conventional 4-wire channel wherein two of the lines 24a, FIG. 2, are receiving lines (TIP and RING) for transferring information to the computer 14 and two of the lines 24b are transmitting lines (TIP and RING) for transferring information from the computer 14. For sake of simplicity, the 4-wire telephone or other channel is represented by a single line or double lines in FIGS. 1–5.

The network is formed using one or more bridges, with bridges possibly being cascaded in some connections for larger networks. For example in FIG. 1 the communication line or channel 24 from the computer 14 is connected to a bridge 10 which in turn couples the line 24 to first tier branch lines 32, 34, 36 and 38. Channel terminating units 101 and 102 on the ends of the first tier branch lines 32 and 34 connect these lines to user stations, only station 12 shown in FIG. 1 connected by modem 17 to the unit 101. The ends of second tier branch lines 36 and 38 are connected by respective bridge circuits 20 and 21 to third tier branch lines 48, 50, 52, 54 and 56. The remote ends of the lines 48, 50, 52, 54 are connected by respective terminating units 201, 202, 211 and 213 to user stations (not shown). The end of the line 56 is connected by a further bridge 30 to fourth tier branch lines 72 and 74 which have their ends connected by respective terminating units 301 and 302 to user stations, only unit 301 shown in FIG. 1 connected by modem 18 to user station 13.

The channel terminating units 101, 102, 201, 202, 211, 212, 301 and 302 are conventional units which may or may not include testing circuitry. Suitable terminating units with individual addressable testing are models 618 and 719 from Conklin Instrument Corporation, Pleasant Valley, N.Y. 12569, which include testing circuitry selectively responsive to a series of DTMF signals for disconnecting the ends of the branch lines from the user stations, for looping back the transmitting lines to the receiving lines, or for applying a test signal to the transmitting lines. Addressable circuitry for selecting one of the terminating units and connecting loopback circuitry, quiet termination, or remote test signal is described in our U.S. Pat. No. 4,403,119 granted Sept. 6, 1983. Channel terminating units with testing circuitry that cannot be individually addressed include model 829 from Western Electric Company, and other units which have circuitry responsive to a 2713 Hz signal to connect or disconnect a loopback circuit.

A testing unit 80 which includes a DTMF key pad or source is connected to the transmitting lines of the channel 24. As shown in FIG. 2, the testing unit 80 may be a unit such as model 411 from Conklin Instrument Corporation which, in addition to the standard DTMF telephone key pad, includes an audio monitor for detecting signals on the receiving lines 24a.

The telephone communication system illustrated in FIG. 1 may be formed within a single building or complex, or the communication system may include communication or telephone lines, microwave links, etc. connecting the computer 14 to user stations in different portions of a city or in different cities. The bridges 10, 20, 21 and 30 may be located in central telephone switching offices or at subscriber premises where branching of the lines occurs.

The bridge 10 as shown in FIG. 2, includes a collection unit 82 and a distribution unit 84 with optional collection expander units (only one collection expander unit 86 shown) and corresponding distribution expander units (only one distribution expander unit 88 shown). The 4-wire communication line 24 of FIG. 1 is illustrated in FIG. 2 as receiving line 24a and transmitting line 24b, and the secondary branch lines 32 of FIG. 1 are illustrated as receiving line 32a and transmitting line 32b in FIG. 2. Each of the lines 24a, 24b, 32a and 32b include a pair of conventional lines (TIP and RING). In one embodiment, the units 82, 84, 86 and 88 are modular units which are adapted to be connected to a conventional back plane of a mounting shelf which provides interconnections between the units as well as to a suitable power source (not shown).

The collection unit 82 includes a primary port 90 connected to the receiving lines 24a and includes five secondary ports 92, 93, 94, 95 and 96 connectable to branch receiving lines, only the branch receiving lines 32a being shown connected to the port 92. The secondary ports 92-96 are connected by respective amplifiers (only amplifiers 104 and 106 shown in FIG. 2) to common junction 108 which is connected by an amplifier 110 to the primary port 90 for connecting the secondary ports 92-96 to the primary port 90. The collection expander unit 86 provides an additional six secondary ports 114, 115, 116, 117, 118 and 119 which are connected by respective amplifiers (only amplifiers 122 and 124 shown in FIG. 2) to the common junction 108 by means of a back plane connection. The collection unit 82 and the collection expander unit 86 serve to join receiving branch lines connected to the secondary ports 92-96 and 114-119, to the primary port 90 and receiving lines 24a to transmit signals received by any of the secondary ports 92-96 and 114-119 onto the receiving lines 24a.

The distribution unit 84 has a primary port 122 connected to the transmission lines 24b and has five secondary ports 124, 125, 126, 127 and 128 for being connected to branch transmission lines, only the branch transmission lines 32b being shown connected to the port 124 in FIG. 2. An amplifier 130 connects the primary port 122 to a common junction 132, and amplifiers (only amplifiers 134 and 136 shown in FIG. 2) connect the common junction 132 to the corresponding secondary ports 124-128. The distribution expander unit 88 has six secondary ports 140, 141, 142, 143, 144 and 145. The common distribution junction 132 is connected to inputs of the amplifiers (only amplifiers 148 and 150 shown in FIG. 2) which have outputs connected to the respective branch transmit ports 140-145. The distribution unit 84 and the distribution expander unit 88 serve to connect the transmitting lines 24b, connected to the port 90, to secondary ports 124-128 and 140-145 and any transmitting branch lines to transmit signals received by primary port 122 onto all of branch transmitting lines connected to the secondary ports 124-128 and 140-145.

The bridge can include additional pairs of collection and distribution expander units to enable additional secondary ports for branch circuits. The bridge circuitry described in the preceding two paragraphs is similar to circuitry available in conventional bridge circuits, such as model 4685 collection bridge, model 4686 distribution bridge, model 4687 collection bridge expanders and model 4688 distribution bridge expander from Conklin Instrument Corporation. In one embodiment, all of the ports 90, 92-96, 114-119, 122, 124-128 and 140-145 have test and monitor jacks (not shown) and are coupled through respective isolation transformers (not shown) included in the inputs or outputs of the corresponding amplifiers. The amplifiers 130, 104, 106, 122 and 124 have switchable 150, 600 and 1200 ohm input impedances (not shown) and have continuous variable gain from $-6$ DB to $+33$ DB to accept input signal levels from $-26$ TLP to $+13$ TLP and provide a standard $+7$ TLP on the common junctions 108 and 132. The amplifiers 110, 134, 136, 145 and 150 producing output signals have selectable output gain of $+1$ DB to $-23$ DB to provide continuously variable output levels of $+8$ TLP to $-16$ TLP.

The present bridge differs from the prior art bridge by including a DTMF decoder translator circuit 156 in the distribution unit 84, unit port select circuits 158 and 160 in the respective collection unit 82 and collection expander unit 86, relays 162, 163, 164, 165 and 166 (see FIG. 4, only relays 162 and 166 shown in FIG. 2) operated by the unit port select circuit 158 for opening and closing contacts in series with the secondary ports 92-96, relays 170, 171, 172, 173, 174 and 175 (see FIG. 5, only relays 170 and 175 shown in FIG. 2) operated by the unit port select circuit 160 for opening and closing contacts in series with the respective secondary ports 114-119, and relay switching facilities indicated generally at 178 in the collection unit 82 and relay facilities indicated generally at 180 in the distribution unit 84 both operated by the unit port select circuit 158 for disconnecting the amplifiers 110 and 130 from the common junctions 108 and 132 and for providing a loopback connection between the amplifiers 130 and 110. Generally the DTMF generator unit 80 is used to send a series of DTMF signals wherein a first portion of the signals corresponds to a bridge address which is detected by the DTMF decoder translator circuit 156 to enable the bridge, and when enabled, a second portion of the signals corresponding to a port address is decoded and transmitted to units 158 and 160 which selectively operate one or more of the relays 162-166, 170-175, 179 and 180 to disconnect or connect one or more of the branch lines or to establish a loopback circuit in the primary port. Data and clock outputs of the DTMF decoder translator 156 are connected by back plane cross connect lines 182 and 184 to the unit port select units 158 and 160 in the respective collection unit 82 and collection expander unit 86. A back plane cross connection 186 between the units 82 and 84 joins the relay facilities 178 and 180 for simultaneous operation, and a back plane cross connection 188 between the units 82 and 84 provides a circuit path for the loopback.

Figure 3:
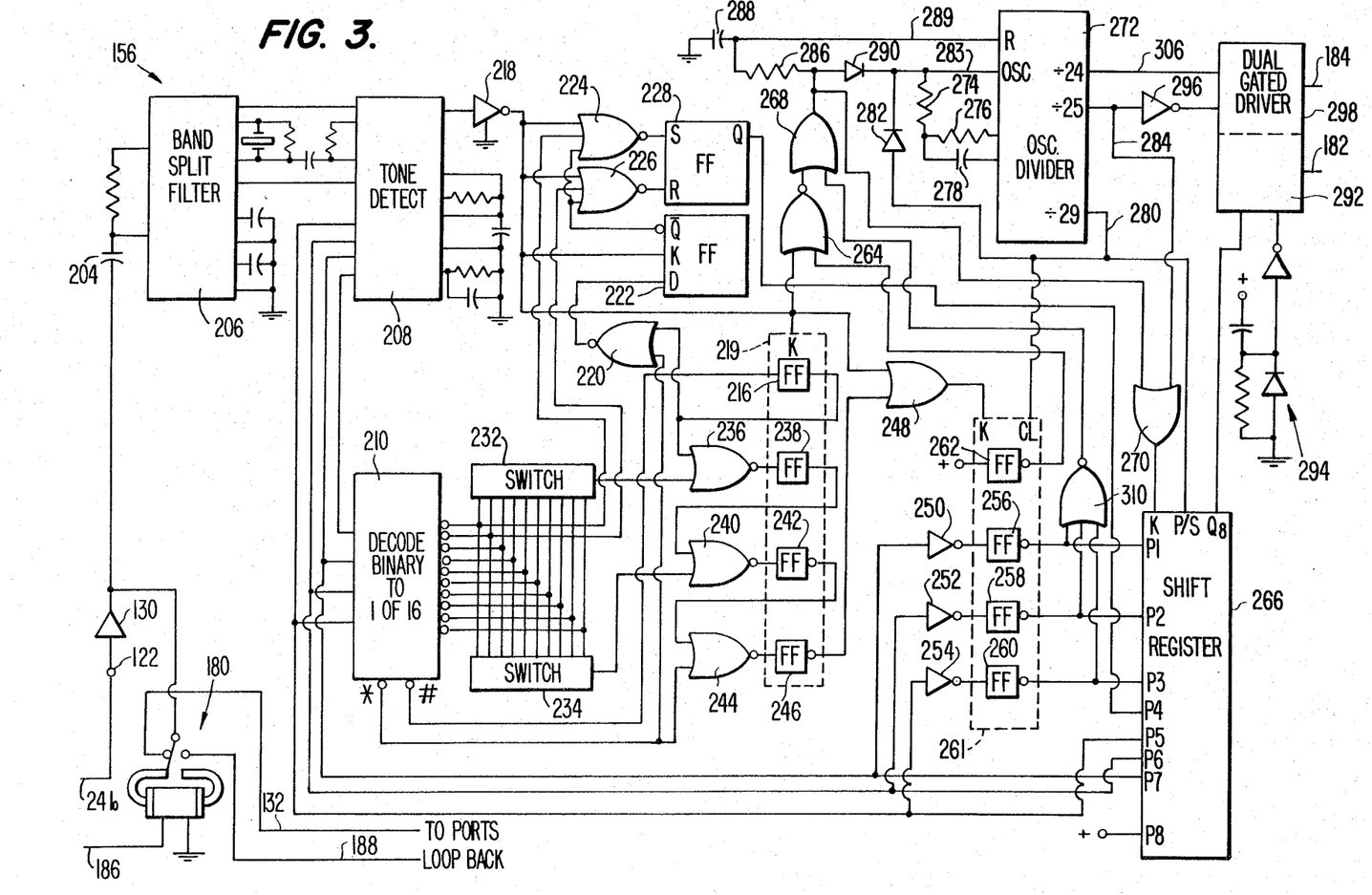
FIG. 3 is a detailed circuit diagram of a DTMF decoder translator circuit portion of a distribution unit in the bridge of FIG. 2.

As shown in FIG. 3 the DTMF signals on the transmitting line 24b and amplifier circuit 130 are applied through an isolating capacitance 204 to inputs of a bandsplit filter circuit unit 206 which has its high and low frequency outputs connected to inputs of a tone detector unit 208. The binary outputs of the tone detector 208 are connected to inputs of a binary to 1-of-16 decoder circuit unit 210. The output of the decoder 210 corresponding to the DTMF key # is connected to the data input of a first flip flop 216, and the clock or strobe output of the tone detect circuit 208 is connected by an inverter 218 to the clock input of a quad integrated circuit 219 containing the flip flop 216. The output of the flip flop 216 is connected to one input of a NOR gate 220 which has its other input connected to the output of the decoder circuit 210 corresponding to the DTMF asterisk key *. The output of the gate 220 is connected to the data input of a flip flop 222 which has its clock input connected to the output of the clock inverter 218. The inverted output of the flip flop 222 is connected to one input of NOR gates 224 and 226 which have second inputs connected to the output of the clock inverter 218 and have third inputs connected to the respective outputs of the decoder 210 corresponding to the DTMF keys 1 and 2, respectively. The outputs of the NOR gates 224 and 226 are connected to the respective set and reset inputs of a flip flop 228.

Figure 6:
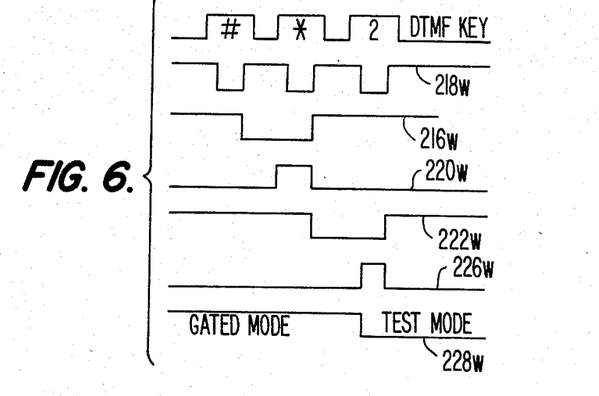
FIG. 6 is a timing graph showing electric line signals from several components of FIG. 3 for setting the mode of the bridge.

The testing function of the bridge operates in two modes, a test mode and a gated mode. These modes are determined by the output of the flip flop 228. The test circuitry of the bridge is placed in the test mode by the DTMF sequence #*2 sequentially operating flip flop 216, gate 220, flip flop 222 and gate 224 to set flip flop 228 to produce a low output, and is placed in the gated mode by the DTMF sequence #*1 sequentially operating flip flop 216, gate 220, flip flop 222 and gate 226 to reset flip flop 228 to produce a high output. In FIG. 6, the DTMF key sequence #*2 and the output wave forms 218w, 216w, 220w, 222w, 226w and 228w from the respective inverter 218, flip flop 216, gate 220, gate 226 and flip flop 228 are shown in changing the mode from the gated mode to the test mode.

In a prototype embodiment, the third inputs of NOR gates 224 and 226 were connected to the outputs of the decoder 210 corresponding to DTMF keys 8 and 9, respectively, instead of 1 and 2 as in the example described herein where 1 and 2 were selected to avoid interfering with codes of a described channel terminating unit.

Figure 7:
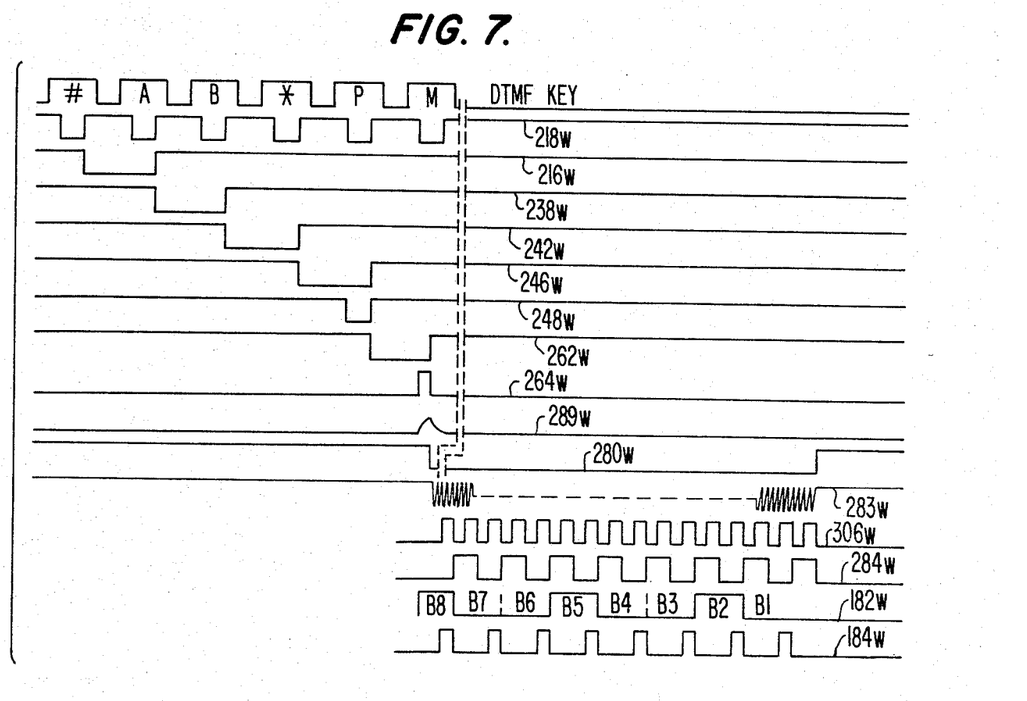
FIG. 7 is a timing graph showing electric line signals from several components of FIG. 3 during operation of the bridge testing facilities for operating individual port switches.

A pair of ten position switches 232 and 234 have inputs connected to the respective outputs of the decoder 210 corresponding to the digits 0 through 9 for selectively connecting the outputs of the decoder to the common output of the switch to thus select a two-digit address for the bridge. In the example of FIG. 1 the bridge 10 has the address 10, and the switch 232 would be set to select the number 1 position and the switch 234 would be set to select the number 0. The output of the switch 232 is connected to one input of OR gate 236 which has its other input connected to the output of the flip flop 216 so that the gate 236 is operated when the correct first bridge digit immediately follows a number sign #. The output of the gate 236 is applied to the data input of a flip flop 238 in IC 219. The output of flip flop 238 is connected to one input of a NOR gate 240. The other input of the NOR gate 240 is connected to the output of the switch 234 so that the gate 240 is operated to activate flip flop 242 in IC 219 when the correct second digit of the bridge address follows a number sign # and the correct first digit of the bridge address. The inverted output of the flip flop 242 is connected to one input of a NOR gate 244 which has its other input connected to the output of the decoder 210 corresponding to the asterisk key * so that the flip flop 246 connected to the output of gate 244 is operated when a sequence of DTMF signals #AB (wherein AB is the correct bridge address in switches 232 and 234) is completed to enable the bridge switching circuitry. FIG. 7 illustrates the key sequence #AB* and output waveforms 218w, 216w, 238w, 242w and 246w from the respective inverter 218, flip flop 216, flip flop 238, flip flop 242 and flip flop 246 in enablement of the bridge switching operation. The inverted output of the flip flop 246 is connected to one input of an OR gate 248 for enabling the passing of the next strobe signal from the inverter 218 connected to the other input of the gate 248, see output waveform 248w from the gate 248.

After the bridge has been enabled, the circuit can receive the remaining two DTMF digits, PM in the DTMF sequence corresponding to the port number or address and module number. The three least significant binary outputs of the tone detector 208 are connected by respective inverters 250, 252 and 254 to data inputs of flip flops 256, 258 and 260 in quad IC 261, which is clocked by the output of the OR gate 248 to store the binary digit corresponding to the port to be operated. Additionally a flip flop 262 having its data input connected to the positive source is set by the clock output from gate 248 to apply a signal, see waveform 262w, from its inverted output to one input of a NOR gate 264 to enable the gate 264 which has its other input connected to the clock inverter 218. A parallel-in serial-out shift register circuit unit 266 has its first three parallel bit inputs connected to the corresponding inverted outputs of the flip flops 256, 258 and 260, has its fourth bit input connected to the output of the mode flip flop 228, has its fifth, sixth and seventh bit inputs connected to the corresponding three lowest significant binary outputs of the tone detector circuit 208, and has its eighth bit input connected to a positive voltage source. The output of the NOR gate 264, see waveform 264w, is connected to one input of an OR gate 268 which has its output connected to an input of an OR gate 270 driving the clock input of the shift register 266 for clocking the parallel input data into the shift register 266 when the subsequent DTMF modula code M is received by the tone detect circuit 208.

The serial output of the data in the shift register 266 is controlled by an oscillator divider unit 272 which has a conventional network of resisters 274 and 276 and capacitor 278 controlling the oscillator of the unit 272. One output line 280 of the unit 272 is connected to the parallel serial select input of the shift register 266 for selecting the parallel input when the line 280 is high and the serial output operation of the shift register when the line 280 is low, see waveform 280w. Also the line 280 is connected by a diode 282 to an input 283 of the oscillator section of the unit 272 for holding the oscillator off when the line 280 is high. The divider output on line 284, see waveform 284w, corresponds to the desired frequency or rate of serial output from the shift register 266 and is connected to the second input of the OR gate 270 for clocking the shift register 266 during the serial output. The output of the OR gate 268 is connected to a delay circuit formed by a serial resistance 286 and capacitance 288 connected to ground. The divider reset input 289 of the unit 272 is connected to the junction between the resistance 286 and capacitance 288 for resetting the divider to 0 after a delay sufficient to permit the inputting of the parallel data into the shift register 266, see waveform 289w on the input 289. The output of the OR gate 268 is also connected to the oscillator control input 283 by a diode 290 for holding the oscillator in an off position during the clock pulse passing through gate 264. The output 280 is selected to be a division by sixteen of the output 284. Thus waveform 280w goes high after eight pulses have been produced on line 284 to again disable the oscillator and stop operation of the unit 272. The output 280 is also connected to the clear input of IC 261 containing the flip flops 256, 258, 260 and 262 to reset these flip flops when the divider is reset and the line 280 goes low.

The serial output of the shift register is applied to one input of a gated driver 292 which has its other input connected to a power-up circuit indicated generally at 294 for disabling the gate 292 for a period after power is applied or restored to the circuit to prevent false operation of the testing circuitry. The bits in the register 266, beginning with bit B8 which is always high, are serially applied to line 182 which is connected connected to the output of driver 292, see waveform 182w. The divider output 284 is inverted by inverter 296 and applied to a second gated driver 298 which has its other input connected to the divider output 306 which has pulses, see waveform 306w, at a rate which is twice the rate of pulses on line 284. The output of gate 298 on line 184, see waveform 184w, is a series of eight sync pulses which have leading edges intermediate the leading and trailing edges of the serial data pulses on line 182.

The data pulse output on line 182 will generally occur at a much faster rate than the DTMF key input. The right hand portion of FIG. 7, particular waveforms 280w, 283w, 306w, 284w, 182w and 184w are expanded relative to the left hand portion and other waveforms. For example, the serial output on line 182 may be at about 500 Hz which would require about 16 milliseconds to generate all eight serial bits while manual key entry of any one of the DTMF signals will normally occur over a considerably longer time period.

The PM portion of the series of DTMF signals keyed in to operate the relays in the bridges is converted to binary form and transmitted on line 182 as respective portions of a serial data word. Since the binary form of P and M is limited to only three binary digits, P and M are limited to the DTMF digits 1 through 8, 0 being the same as 8. P corresponds to the port number and M corresponds to the module number. Since each module contains only six ports and there can be eight modules (one collection unit plus seven collection expander units) the circuitry can operate forty-eight ports (one primary port and forty-seven secondary ports) in each bridge. The P digits of 7 and 8 are used for operating all relays of an expander module and for operating all relays in secondary ports of a bridge, respectively.

Figure 8:
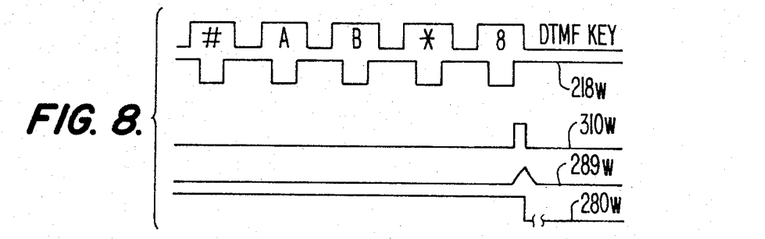
FIG. 8 is a timing graph showing line signals from several components of FIG. 3 during operation of the bridge testing facilities to simultaneously operate a plurality of port switches.

A three-input NOR gate 310 has its inputs connected to the inverted outputs of the respective flip-flops 256, 258 and 260 for detecting a binary number of 000 which will occur upon P being equal to 0 or 8. The output of gate 310 is connected to a second input of OR gate 268. As shown in FIG. 8 by the waveforms 310w, 289w8, 280w8 from the gate 310, the line 289 and output 280, respectively, the entry of a P equal to 8 or 0 causes the circuit to begin transmitting the serial word on line 182 without waiting for entry of a module number M. Both P and M will be equal to 0.

Figure 4:
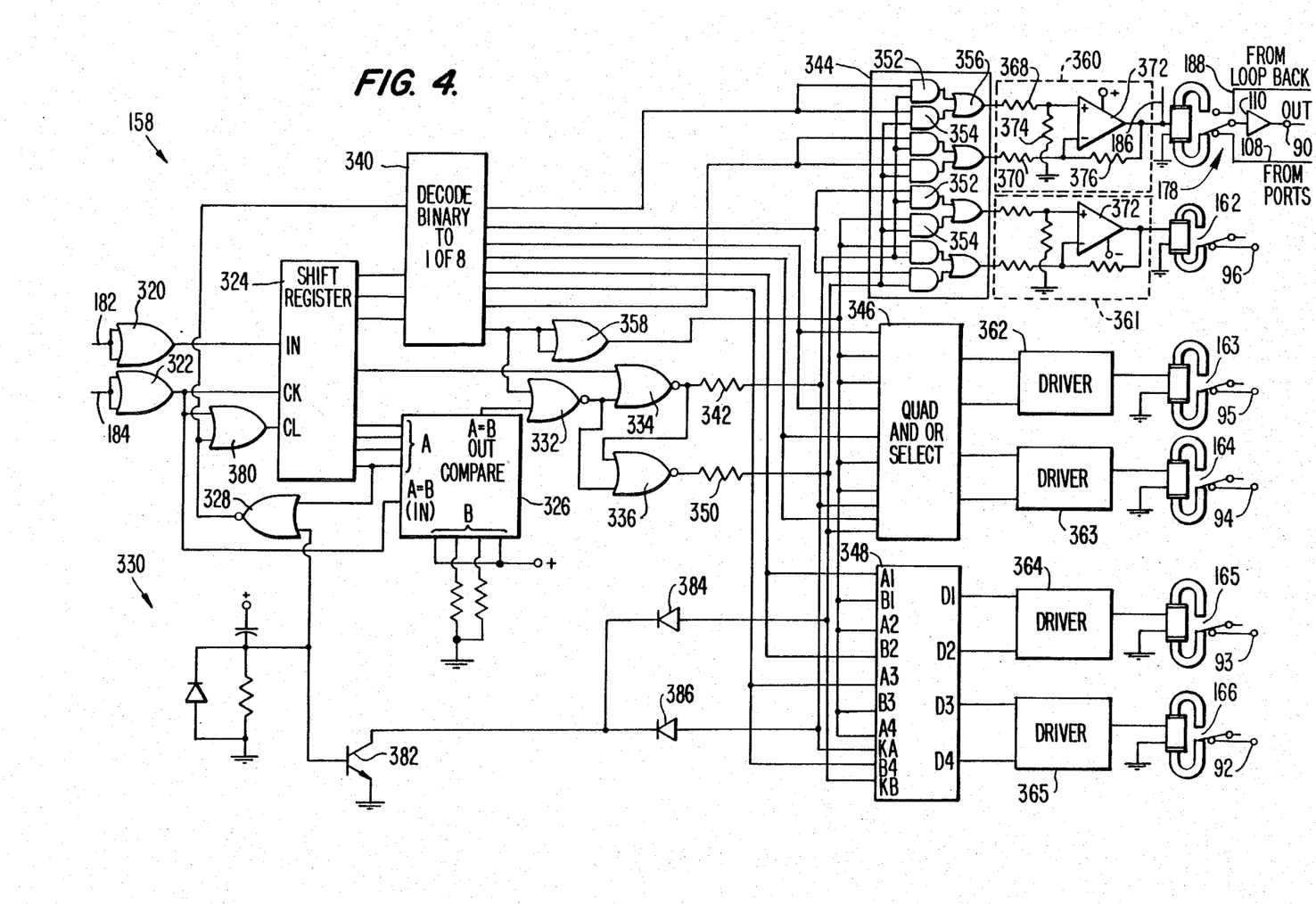
FIG. 4 is a detailed circuit diagram of a unit port select circuit portion in a collection unit of the bridge of FIG. 2.

In the unit port select circuit 158 as illustrated in FIG. 4, the serial data bits on line 182 and the clock pulses on line 184 are applied by respective OR gates 320 and 322 connected as buffers to the data input and clock input, respectively, of a serial-in parallel-out shift register 324 for shifting the data bits on line 182 into the register 324. The four most significant outputs of register 324 receiving bits B8, B7, B6 and B5 on the eighth clock pulse are connected to the A inputs of a comparing unit 326 which has its three least significant B inputs wired to correspond to binary 001, the most significant bit of B input being wired high. The carry-in input of the compare unit 326 is connected to the output of the gate 322. The compare unit 326 is used to compare the fifth, sixth and seventh bits of the data word (corresponding to M in the DTMF series in the register 324 with a selected module number which is always 1 in the case of a collection unit such as unit 82 of FIG. 2. The bit B8 of the data word, which is always high and which is shifted into the register 324 first, is used to prevent operation of the circuit 158 until all eight data bits are read into the register 324. During the eighth clock pulse on line 184 and if M in the DTMF series is 1, then the output of the compare unit 326 is high enabling the operation of the circuit 158 in the collection unit 82.

The bit B8 in shift register 324 is also applied to one input of a NOR gate 328 which has its other input connected to a power up circuit 330 to delay operation after power is initially applied or restored after a power loss. The output of the NOR gate 328 is connected to an enable input of a binary to 1 of 8 decoder 340 which has its binary inputs connected to the three least significant outputs of shift register 324 containing bits B1, B2 and B3 corresponding to P in the DTMF series. The output of decoder 340 corresponding to the digit 8 or 0 is applied to a second input of NOR gate 332 to thus enable the circuit 158 when P equals 8 or 0 irrespective of the fact that M does not correspond to 1 as required by the B input of compare unit 326.

Enabling signal from gate 332 is applied to first inputs of NOR gates 334 and 336. The mode bit (B4) output of the shift register 324 is applied to the second input of NOR gate 334 while the second input of NOR gate 336 is connected to the output of gate 334. When enabled by the output of gate 332, the output of gate 334 goes high upon bit B4 being low to call for a test mode, and the output of gate 336 goes high upon bit B4 being high calling for a gated mode. The output of gate 334 is coupled through resistance 342 to A-enable inputs of Quad AND-OR-SELECT circuit units 344, 346 and 348, and the output of gate 336 is coupled through resistance 350 to B-enable inputs of the units 344, 346 and 348. Functionally each of the four AND-OR-SELECT circuits or stages in each of the units 344, 346 and 348 has an A-AND gate 352, a B-AND gate 354, and an OR gate 356 with inputs connected to the outputs of the respective gates 352 and 354. The output of each OR gate constitutes the output of the corresponding AND-OR-SELECT circuit or stage. The A-enable input of each of the units 344, 346 and 348 is connected to first inputs of all the A-AND gates 352 in the corresponding unit to enable the gates 352, and the B-enable input of each unit is connected to first inputs of the B-AND gates 354 in the corresponding unit to enable the gates 354.

The AND-OR-SELECT circuits or stages in the units are utilized in pairs, i.e. the first and second stages in unit 344 form a first pair, the third and fourth stages in unit 344 form a second pair, the first and second states in unit 346 form a third pair, etc., wherein second inputs of the gates in each pair are operated by an output or outputs of the decoder 340. The outputs corresponding to the numbers 1 and 7 from the decoder 340 are connected to the second input of both the A and B gates 352 and 354 in the respective first and second stages of the first pair so that a P of 1 operates the first stage of the first pair and a P of 7 operates the second stage of the first pair when either enabling mode is present from gates 334 and 336. The output corresponding to the number P equal to 2 from decoder 340 is connected to the second input of the A gate in the first stage of the second pair and to the second input of the B gate in the second stage of the second pair, so that upon P equal to 2, the first stage of the second pair is operated in the test mode and the second stage of the second pair is operated in the gated mode. The third, fourth, fifth and sixth pairs of stages in units 346 and 348 have second inputs of A gates in first stages and of B gates in second stages connected to the corresponding outputs of decoder 340 for P equal to 3, 4, 5 and 6 to operate in a manner similar to the second pair. The output of decoder 340 corresponding to a P equal to 8 is connected via OR gate 358 operating as a driver to a second input of the B gate of the first stage and to the second input of the A gate of the second stage of the each of the second, third, fourth, fifth and sixth pairs of stages, so that upon P equal to 8, the first stages of all the second through sixth pairs are operated in the gated mode and the second stages of all the second through sixth pairs are operated in the test mode.

Outputs from the corresponding pairs of the stages in the units 344, 346 and 348 are connected to respective driver circuits 360, 361, 362, 363, 364 and 365 which in turn have outputs connected to respective polarized relays 178, 180 (FIG. 3 through line 186), 162, 163, 164, 165 and 166. In each driver circuit 360-365, the first and second stages of each corresponding pair of stages are connected by respective resistances 368 and 370 to the respective non-inverting and inverting inputs of an operational amplifier 372. The non-inverting input of the amplifier 372 is biased by resistance 374 to ground while the inverting input is connected by feedback resistance 376 to the output of the amplifier 372 driving the corresponding relay. A high on the output of the first stage of a pair of stages drives the output of the amplifier 372 positive while a high on the output of the corresponding second stage drives the output of the amplifier 372 negative. The relays 178, 180 and 162-166 are latching relays which are switched from a first state to a second state by a positive voltage pulse, and from the second state to the first state by a negative voltage pulse.

When P is equal to 1, the relays 178 and 180 (see also FIGS. 2 and 3) are operated to disconnect the primary ports 90 and 122 from the common junctions 108 and 132 and to establish a loopback circuit through line 188, and when P is equal to 7, the relays 178 and 180 are operated to disconnect the loopback circuit and reestablish the connection of the common junctions 108 and 132 to the primary ports 90 and 122 irrespective of which mode signal is produced by gates 334 and 336. When P is equal to one of the numbers 2, 3, 4, 5 or 6, the corresponding relay 162, 163, 164, 165 or 166 will be operated to disconnect the corresponding port 92, 93, 94, 95 and 96 from the common junction 108 in the test mode, and to reconnect the corresponding port to the common junction in the gated mode. When P is equal to 8, the relays 162, 163, 164, 165 and 166, will be operated to connect all unconnected ports 92, 93, 94, 95 and 96 to the common junction 108 in the test mode, and to disconnect any such connected ports from the common junction in the gated mode.

In FIG. 4, the output of the NOR gate 328 is also connected to one input of an OR gate 380 which has its other input connected to the output of gate 322 passing clock pulses. The output of gate 380 is connected to the clear input of the shift register 324. At the termination of the eighth clock pulse on line 184, the gate 380 applies a low to the clear input of register 324 to reset the register and terminate operation of the unit port selection circuit 158.

A transistor 382 has its base connected to the power up circuit 330 and has its collector connected through isolating diodes 384 and 386 to the respective junction of resistances 342 and 350 with the respective A enable and B enable inputs of the units 344, 346 and 348. During a period of initially applying voltage, or the reapplying of voltage after a power failure, the enable inputs of the units 344, 346 and 348 are held low to avoid spurious operation.

Figure 5:
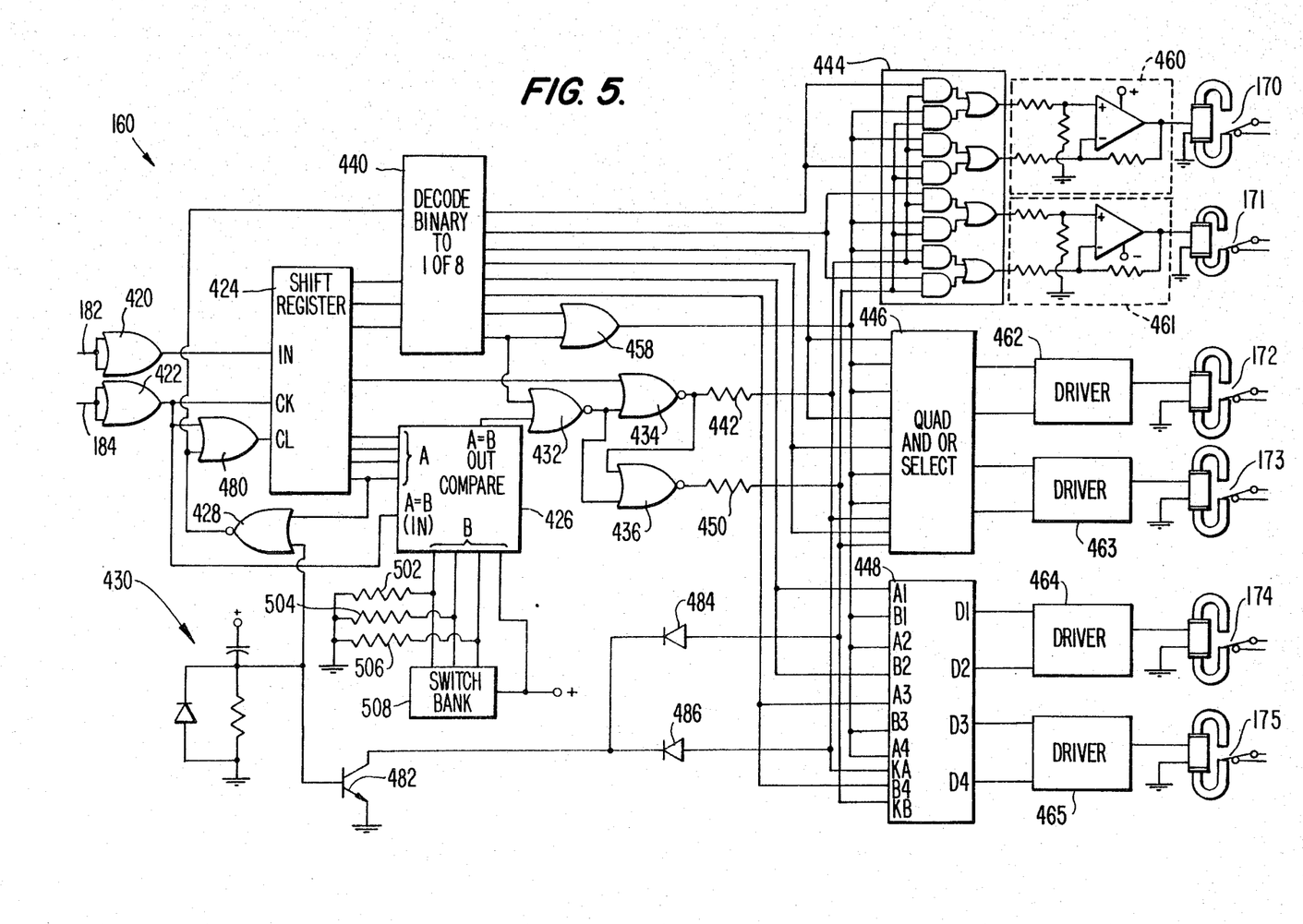
FIG. 5 is a detailed circuit diagram of a unit port select circuit portion in a collection expander unit in the bridge of FIG. 2.

The circuitry of the unit port select circuit 160 in the collection expander unit 86 is shown in FIG. 5 and has portions which are similar to the circuitry 158 in FIG. 4. Components in FIG. 5 which are similar to those in FIG. 4. have numbers corresponding to those in FIG. 4 except that the hundreds digit is changed from 3 in FIG. 4 to 4 in FIG. 5 so that the structure and operation of components of the circuit in FIG. 5 which are not hereinafter described can be understood by referring to the foregoing description of the circuitry in FIG. 4.

The collection expander unit 86 differs from the collection unit 82 in that unit 86 does not contain a primary port but rather includes another secondary port as port 1. Accordingly the 1 output of the decoder 440 is connected to the A and B gates of the respective first and second stages in the first pair of stages in the Quad AND-OR-SELECT unit 444 for operating the secondary port relay 170 in a manner similar to the operation of the other secondary port relays. Also the B and A gates of the respective first and second stages of the first pair in the unit 444 have inputs connected to the output of the OR gate 458 so that a universal operating signal from OR gate 458 will cause operation of the relay 170 along with the other secondary relay port relays.

The B inputs of the compare circuit 426 corresponding to the module address or code number are biased by respective resistances 502, 504 and 506 to ground and are connected to respective switches in a switch bank 508 which has a common connected to a positive voltage. The switches in the switch bank 508 can be selected during installation to selectively connect the B inputs of compare unit to a positive voltage source in accordance with a selected module number or code. The module number or code may be any binary number corresponding to 2, 3, 4, 5, 6, 7 or 0. The M portion of a DTMF series must specifiy the module number selected by switches 508 in order to operate any of the relays 170-175, except that the universal operation called for by a P equal to 8 does not require the proper M.

Additionally the collection expander unit can be controlled by the unit 160 to operate all of the secondary ports of the collection expander unit 86 without operating other units in the bridge. The circuit 160 utilizes the output corresponding to a P equal to 7 from the decoder 440 for this purpose. This output is connected to one input of the OR gate 458 to produce a universal operating signal on the output of OR gate 458 to operate the first stage of all pairs of stages in units 444, 446 and 448 when in a gated mode to operate relays 170-175 to open all secondary ports, and to operate the second stage of all pairs of stages when in a test mode to reconnect all secondary ports. The proper M designating the module is required for a P equal to 7 since the output of decoder 440 corresponding to 7 does not activate one of the enable gates 434 and 436.

The operating codes for operating the bridge testing function of the bridge in FIGS. 2, 3 and 4 are set forth in the following Table I.

TABLE I

1. TEST Function (individual port drop-out-universal add-on)
   # * 2 Set TEST Mode.
   # AB * PM General Command Form:
   # -Signifies "Address to follow".
   A - First digit of address (1-9, 0 - Set by switch 232 in FIG. 3)
   B - Second digit of address (1-9, 0 - Set by Switch 234 in FIG. 3)
   * - Signifies "Command to follow".
   P - Number of Port to be dropped:
   2-6 In Collection Unit
   1-6 In Collection Expander Units
   7 Return all Ports to Data (in any expander module).
   8 Return all Secondary Ports in Bridge to Data (M not required for this instruction).
   M - Number of module containing Port P:
   1 Collection Unit
   2-8 Collection Expander Units (Set by switch 508 in FIG. 5)

2. GATED Function (individual port add-on - universal drop-out)
   # * 1 Set GATED Mode.
   # AB * PM General Command Form:
   # - Signifies "Address to follow".
   A - First digit of address (1-9, 0 - Set by switch 232 in FIG. 3.
   B - Second digit of address (1-9, 0 - Set by switch 234 in FIG. 3.
   * - Signifies "Command to follow".
   P - Number of Port to be added:
   2-6 In Collection Unit
   1-6 In Collection Expander Units
   7 Drop all Ports (in any expander module)
   8 Drop all Secondary Ports in Bridge (M not required)
   M - Number of module containing Port P:
   1 Collection Unit
   2-8 Collection Expander Unit (Set by switch in FIG. 5)

3. LOOPBACK Function (common to both modes)
   #AB * PM General Command Form:
   # - Signifies "Address to follow".
   A - First digit of address (1-9, 0 - Set by switch 232 in FIG. 3)
   B - Second digit of address (1-9, 0 - Set by switch 234 in FIG. 3)
   * - Signifies "Command to follow".
   PM - 11 Loop back main port
   71 Restore main port to data The present invention is compatible and may be used in conjunction with channel terminating units or testing units which were previously applied in individual 4-wire branches insofar as such testing units utilize codes which are compatible with the codes for the present bridge testing functions. The terminal test codes utilized in the device of our U.S. Pat. No. 4,403,119 granted Sept. 6, 1983, are set forth in the following Table II. It is noted that the terminal test code as described in our co-pending application utilizes a universal reset code of *N wherein the N can be selected from 5, 6, 7, 8, 9 or 0; to be compatible with the above-described bridge testing functions, N must be selected from 9 and 0 since the bridge test codes include codes having 5, 6, 7 and 8 following an *.

TABLE II

TERMINAL TEST CODES

1. INDIVIDUALLY ADDRESSED FUNCTION
   # ABC * M
   # - Signifies "Address to Follow"
   A - First digit of address
   B - Second digit of address
   C - Third digit of address
   * - Signifies "Command to Follow"
   M   MODE
   -
       1 - Loopback
       2 - Quiet termination
       3 - Millivolt source
       4 - RESET
2. UNIVERSAL RESET
   * N
   * - Signifies "Command to Follow"
   N - Identifies group (must be set to 9 or 0)

As an example of use of the described embodiment for determining a malfunction utilizing the computer network of FIG. 1, it is assumed that the user station 13 has seized the network and is continuously streaming data preventing any of the other user stations from using the network. The bridges 10, 20, 21 and 30 have been asigned the addresses 10, 20, 21 and 30. Lines 32, 34, 36 and 38 are connected to ports 2, 3, 4 and 5 of module 1 of bridge 10. Lines 48 and 50 are connected to ports 2 and 3 of module 1 of bridge 20. Lines 52, 54 and 56 are connected to ports 2, 4, and 5 of module 1 of bridge 21. Lines 72 and 74 are connected to ports 3 and 4 of module 2 of bridge 30. The DTMF test unit 80 is utilized to set up the test mode by entering the code #*2. Next the secondary ports 2, 3, 4 and 5 of the bridge 10 are dropped by entering the codes #10*21, #10*31, #10*41 and #10*51. It is noted that the streaming disappears when the secondary port 5 of bridge 26 is dropped by the disappearance of noise from the monitor speaker. The secondary ports of bridge 10 may then be restored by entering the DTMF code #10*8. From the diagram of FIG. 1 it is determined that bridge 21 is the next bridge in the suspect circuit. The secondary ports of bridge 21 are then sequentially dropped by the sequence of codes #21*21, #21*31, #21*41 and #21*51 whereupon the circuit again becomes quiet when the port 5 of bridge 21 is dropped. These ports are restored by the sequence #21*8. Then dropping of the ports of the second module of bridge 30 is begun by the DTMF sequences #30*22 and #30*32 whereupon it is determined that the problem of data steaming is associated with the branch line 72 connected to port 3 of the second module in bridge 30. The disconnected port 2 of bridge 30 may be reconnected by employing the code #*1 to set the gated mode and then utilizing the sequenced #30*22 to restore the port 2 to service. At this point the network is now returned to service for all users except the user station 13. Further testing may then be made at the user station 13 to determine the source of data streaming and correct the problem before returning port 3 of bridge 30 to service.

An example of utilizing the gated function to determine the data streaming problem associated with the user station 13 employes the sequence #*1 to initially set the circuit in the gated mode. The code #10*8 is utilized to drop all of the secondary ports of bridge 10 from the circuit. Then the codes #10*21, #10*31,

10*41 and #10*51 are utilized to sequentially restore the secondary ports to service whereupon the problem is found to reoccur when port 5 is added. Then the secondary ports of bridge 21 are dropped by the code #21*8 and the individual output ports are restored by #21*21, #21*31, #21*41 and #21*51, the latter determining that the problem exists with respect bridge 30. The secondary ports of bridge 30 are then dropped by #30*8 and sequentially restored by #30*22, #30*32 (noting that the problem now occurs) and #30*42. The port 3 of bridge 70 may be dropped by calling the test function with the code #*2 and utilizing the code #30*32 to drop that port whereupon the remaining portion of the network is restored to service. Port 3 can then be added into service after the problem associated with user station 13 is determined and corrected.

In another example, channel terminating units 101, 102, 201, 211, 212, 301 and 302 are the type wherein a loopback circuit is connected or disconnected by a single operating frequency tone sent over the network. The sending of the operating tone over the line 24 would result in all of the terminating units operating to loopback all of the branch lines. Thus in the prior art the branch lines had to be manually disconnected at the bridge location and testing had to be performed on a disconnected line. However the present invention enables a single terminating unit to be selected. For example the gated function can be selected and all of the secondary ports from bridge 10 can be dropped. Then port 2 is selectively connected and the operating tone signal is sent out on lines 24. Only the terminating unit 101 responds to connect the lines 32 in a loopback circuit enabling the testing of the line 32 by sending test tones thereon.

Additionally tests can be run upon the lines between bridges by utilizing the loopback functions of the primary ports of the bridges themselves. The code #20*11 would result in the bridge circuit 20 connecting its primary port in a loopback arrangement. Then tests can be conducted on the line 36 through line 24 prior to restoring the primary port with the code #20*71.

The present invention is particularly advantageous in that it enables the utilization of common circuitry within a bridging unit to perform branch disconnect and reconnect to test for malfunctions in branch circuits or equipment connected to such branch circuits. This has eliminated the need for a multiplicity of addressable testing units to be connected into the individual branch circuits adjacent to the bridge.

Additionally the present invention can be utilized in a circuit including individual test units on the remote ends of branches. Particularly it is noted that the present bridge testing functions of Table I employ a two digit address code for the bridge whereas the terminal test codes as set forth in Table II call for a three digit address code. When a two digit bridge address code is called up, the * following the two digit address causes the terminating units to ignore the instruction code. Similar a three digit address of the terminal channel terminating units is ignored by the bridge testing function circuits.

Since many modifications, variations and changes in detail may be made to the above described embodiments, it is intended that all matter in the foregoing description and in the accompanying drawings be intepreted as illustrative and not in a limiting sense.

What is claimed is:

1. A communication bridge responsive to a series of control signals containing a bridge address code and a port address code, the bridge comprising:
   a primary port,
   a plurality of secondary ports,
   branching means for coupling the primary port to the plurality of secondary ports,
   a plurality of electrically operated switch means connected in series with the respective secondary ports,
   bridge switch enablement means connected to the primary port and responsive to the bridge address code corresponding to a predetermined bridge address for enabling a bridge switching function, and
   port address means enabled by the bridge switch enablement means and being responsive to the port address code for selectively operating one of the plurality of electrically operated switch means.

2. A communication bridge as claimed in claim 1 including mode means having first and second modes for opening and closing, respectively, the secondary port switch means, and means responsive to a second series of control signals for selectively setting the mode means in the first and second modes.

3. A communication bridge as claimed in claim 2 wherein the mode means includes a test mode means for selectively disconnecting individual secondary ports in response to individual port address codes and for simultaneously reconnecting all secondary ports in response to a collective port address code, and includes a gating mode means for selectively connecting individual secondary ports in response to individual port address codes and for simultaneously disconnecting all secondary ports in response to a collective port address code.

4. A communication bridge as claimed in claim 3 including loopback switch means connected to the primary port, and wherein said port address means includes means responsive to a first primary port address code for operating said loopback switch means to establish a loopback circuit and responsive to a second primary port address code for operating said loopback switch means to disconnect the loopback circuit.

5. A communication bridge as claimed in claim 2 including loopback switch means connected to the primary port, and wherein said port address means includes means responsive to a primary port address code for selectively operating the loopback switch means.

6. A communication bridge as claimed in claim 1 including loopback switch means connected to the primary port, and wherein said port address means includes means responsive to a primary port address code for selectively operating the loopback switch means.

7. A communication bridge as claimed in claim 1 wherein the series of control signals is a series of dual-tone multi-frequency signals; the bridge switch enablement means includes means for decoding the control signals into digital signals, and means for transmitting digital signals corresponding to the port address code to the port address means.

8. A communication bridge as claimed in claim 7 wherein the transmitting means includes first shift register means for receiving the digital signals, start bit means for producing a first bit in the shift register means, and oscillator means for generating a series of clock pulses to serially transmit the first bit and the digital signals from the first shift register means; and the port address means includes second shift register means operated by the oscillator means for receiving the series of first bit and digital signals, and means for preventing operation of the port address means until the first bit is shifted in the second shift register to a corresponding output indicating that all of the digital signals have been inputed into the second shift register.

9. A communication bridge as claimed in claim 1 adapted for connecting a primary 4-wire telephone channel to a plurality of 4-wire branch telephone channels wherein the 4-wire telephone channels each include a pair of receiving lines and a pair of transmitting lines; and wherein the bridge includes distribution means having a primary distribution port for being connected to the pair of primary transmitting lines, a plurality of secondary distribution ports for being connected to the respective pairs of branch transmitting lines, and distribution branch means for coupling the primary distribution port to the plurality of secondary distribution ports; said bridge switch enablement means being connected to said primary distribution port; collection means including a primary collection port for being connected to the pair of primary receiving lines, a plurality of secondary collection ports for being connected to the respective pairs of branch receiving lines, and collection branch means for coupling the primary collection port to the plurality of secondary collection ports; and said plurality of electrically operated switch means being connected in series with the respective secondary collection ports.

10. A communication bridge as claimed in claim 9 wherein the series of control signals is a series of dual-tone multi-frequency signals; and the bridge switch enablement means includes means for decoding the control signals into digital signals, and means for transmitting digital signals corresponding to the port address code to the port address means.

11. A communication bridge as claimed in claim 10 including expander module means having distribution means with a plurality of expander secondary ports for being connected to respective pairs of additional branch transmitting lines, and expander distribution branch means for coupling the primary distribution port to the plurality of expander secondary distribution ports; expander collection means including a plurality of expander secondary collection ports for being connected to respective pairs of additional branch receiving lines, and expander collection branch means for coupling the primary collection port to the plurality of expander secondary collection ports; a plurality of electrically operated expander switch means connected in series with the respective expander secondary collection ports; and expander port address means connected to the bridge switch enablement means for receiving the digital signals corresponding to the port address code and for selectively operating one of the plurality of expander switch means in response to a corresponding port address code.

12. A communication bridge as claimed in claim 11 wherein the port address code includes a module code and a port code, and each of said port address means includes distinct module code means for operating the corresponding switch means only in response to the module code corresponding to the distinct module code for individual port codes.

13. A communication bridge as claimed in claim 9 including mode means having first and second modes for controlling the operation of the port address means in closing and opening, respectively, the switch means; and means responsive to a second series of control signals for selectively setting the mode means in the first and second modes.

14. A communication bridge as claimed in claim 13 wherein the first and second series of control signals are series of dual-tone multi-frequency signals; the bridge switch enablement means includes means for decoding the control signals into digital signals; the means responsive to the second series of control signals is responsive to the digital signals; and the bridge switch enablement means includes means for transmitting digital signals corresponding to the port address code and the mode to the port address means.

15. A data network for connecting a plurality of user stations to a primary computer station by means of a primary communication line to the primary computer and a plurality of branch secondary communication lines to the user stations, the network comprising,
   a communications bridge connecting the primary communication line to the plurality of secondary communication lines, said bridge including a plurality of electrically operated switch means connected in series with the secondary communication lines, bridge switch enablement means connected to the primary communication line and being responsive to a series of bridge address signals for enabling the bridge switch enablement means, and port address means enabled by the bridge switch means and being responsive to port address control signals for operating the switch means;
   a plurality of testing units connected in respective branch lines and each having switching means connected in series with the corresponding branch lines, and terminal address means responsive to predetermined addresses of the terminal address means for operating the corresponding testing unit switching means;
   said bridge switch enablement means including means responsive to a series of DTMF digits having a beginning digit, a plurality of N address digits, and an end of address digit;
   said terminal address means including means responsive to a series of DTMF digits having a beginning digit, a plurality of M address digits, and an end of address digit; and
   wherein N does not equal M whereby the bridge and the testing units are independent of each other.

16. A data network as claimed in claim 15 wherein the communicating bridge includes mode means having first and second modes for opening and closing, respectively, the switch means, and means responsive to a second series of control signals for selectively setting the mode means in the first and second modes.

17. A data network as claimed in claim 16 wherein the mode means includes a test mode means for selectively disconnecting individual secondary communication lines in response to a collective port address code, and includes a gating mode means for selectively connecting individual secondary communication lines in response to individual port address codes and for simultaneously disconnecting all secondary communication lines in response to a collective port address code.

18. A data network as claimed in claim 15 wherein the communications bridge includes loopback switch means connected to the primary communication line and wherein said port address means includes means responsive to a primary port address code for selectively operating the loopback switch means.

19. A data network as claimed in claim 15 wherein communication lines are 4-wire telephone channels, and the communication bridge is adapted for connecting a primary 4-wire telephone channel to a plurality of 4-wire branch telephone channels wherein the 4-wire telephone channels each include a pair of receiving lines and a pair of transmitting lines; and wherein the bridge includes distribution means having a primary distribution port for being connected to the pair of primary transmitting lines, a plurality of secondary distribution ports for being connected to the respective pairs of branch transmitting lines, and distribution branch means for coupling the primary distribution port to the plurality of secondary distribution ports; said bridge switch enablement means being connected to said primary distribution port; collection means including a primary collection port for being connected to the pair of primary receiving lines, a plurality of secondary collection ports for being connected to the respective pairs of branch receiving lines, and collection branch means for coupling the primary collection port to the plurality of secondary collection ports; and said plurality of electrically operated switch means being connected in series with the respective secondary collection ports.

20. A data network as claimed in claim 19 wherein the communication bridge includes expander module means having distribution means with a plurality of expander secondary ports for being connected to respective pairs of additional branch transmitting lines, and expander distribution branch means for coupling the primary distribution port to the plurality of expander secondary distribution ports; expander collection means including a plurality of expander secondary collection ports for being connected to respective pairs of additional branch receiving lines, and expander collection branch means for coupling the primary collection port to the plurality of expander secondary collection ports; a plurality of electrically operated expander switch means connected in series with the respective expander secondary collection ports; expander port address means connected to the bridge switch enablement means for receiving the digital signals corresponding to the port address code and for selectively operating one of the plurality of expander switch means in response to a corresponding port address code; and the bridge switch enablement means includes means for decoding the control signals into digital signals, and means for transmitting digital signals corresponding to the port address code to the port address means and the expander port address means.

* * * * *